United States Patent
Roth

(10) Patent No.: US 8,988,434 B1
(45) Date of Patent: Mar. 24, 2015

(54) TEXT RENDERING FOR BROWSERS AND MOBILE BASED APPLICATIONS

(75) Inventor: Ian Roth, Brooklyn, NY (US)

(73) Assignee: Google Inc., Mountain View, CA (US)

(*) Notice: Subject to any disclaimer, the term of this patent is extended or adjusted under 35 U.S.C. 154(b) by 230 days.

(21) Appl. No.: 13/445,581

(22) Filed: Apr. 12, 2012

(51) Int. Cl.
*G06T 11/00* (2006.01)

(52) U.S. Cl.
USPC .......................... 345/467; 345/582; 345/548

(58) Field of Classification Search
CPC ........ G06T 11/001; G09G 5/22; G09G 5/222; G09G 5/24
See application file for complete search history.

(56) References Cited

U.S. PATENT DOCUMENTS

| | | | |
|---|---|---|---|
| 8,553,032 B1* | 10/2013 | Poston | 345/423 |
| 2007/0153004 A1 | 7/2007 | Airey et al. | |
| 2008/0018652 A1 | 1/2008 | Toelle et al. | |
| 2010/0164983 A1 | 7/2010 | Lawrence et al. | |
| 2010/0231598 A1 | 9/2010 | Hernandez et al. | |
| 2011/0043528 A1* | 2/2011 | Solomonov et al. | 345/467 |

* cited by examiner

*Primary Examiner* — Antonio A Caschera
(74) *Attorney, Agent, or Firm* — Ropes & Gray LLP

(57) ABSTRACT

A system and method for rendering text data in web applications is provided that eliminates redundant processing. Constant resources are pre-computed and work is offloaded from the central processing unit to the graphics processing unit. This is generally accomplished by pre-computing before any rendering. A generic index vertex buffer object is created, and for each font, a glyph texture object and glyph position texture object are created. A frame including text is then rendered in which a glyph string texture object is created. For each character, a glyph index-to-texture and glyph offset to-texture is appended. A glyph texture, glyph position texture and glyph string texture are then bound, and the generic index vertex buffer object using a custom vertex shader is rendered.

27 Claims, 9 Drawing Sheets

| | Pos | Size | | Pos | Size | | Pos | Size | | Pos | Size |
|---|---|---|---|---|---|---|---|---|---|---|---|
| a | 2,6 | 9,9 | i | 13,16 | 7,13 | q | 22,34 | 10,13 | y | 38,48 | 11,13 |
| b | 12,2 | 10,13 | j | 19,16 | 5,17 | r | 33,34 | 10,9 | z | 50,48 | 9,9 |
| c | 23,6 | 9,9 | k | 24,16 | 10,13 | s | 44,34 | 10,9 | | | |
| d | 33,2 | 10,13 | l | 35,16 | 7,13 | t | 54,31 | 7,12 | | | |
| e | 43,6 | 9,9 | m | 43,20 | 11,9 | u | 62,34 | 10,9 | | | |
| f | 52,2 | 6,13 | n | 56,20 | 10,9 | v | 2,48 | 11,9 | | | |
| g | 58,6 | 10,13 | o | 2,34 | 9,9 | w | 14,48 | 11,9 | | | |
| h | 2,16 | 10,13 | p | 11,34 | 10,13 | x | 26,48 | 11,9 | | | |

FIG. 7

| 0 | 1 | 2 | 3 | 4 | 5 | 6 | 7 | 8 | 9 | 10 | 11 | 12 |
|---|---|---|---|---|---|---|---|---|---|----|----|----|
| 13 | 14 | 15 | 16 | 17 | 18 | 19 | 20 | 21 | 22 | 23 | 24 | ... |

FIG. 8

| T | e | x | t | \n | t | o |   | d | r | a | w | . |
|---|---|---|---|----|---|---|---|---|---|---|---|---|

FIG. 9

| Char | Loc | Char | Loc | Char | Loc | Char | Loc |
|------|-----|------|-----|------|-----|------|-----|
| 84 (T) | 0,0 | 97 (a) | 40,12 | | | | |
| 101 (e) | 8,0 | 119 (w) | 48,12 | | | | |
| 120 (x) | 16,0 | 46 (.) | 56,12 | | | | |
| 116 (t) | 24,0 | | | | | | |
| 116 (t) | 0,12 | ← newline | | | | | |
| 111 (o) | 8,12 | | | | | | |
| 100 (d) | 24,12 | ← space | | | | | |
| 114 (r) | 32,12 | | | | | | |

TEXT RENDERING FOR BROWSERS AND MOBILE BASED APPLICATIONS

BACKGROUND

1. Field of the Disclosure

The present disclosure generally relates to a system and method for rendering text data in web applications while reducing central processing unit to graphics processing unit bandwidth.

2. Background Information

Almost all modern operating systems provide standard application programming interfaces (APIs) for rendering text in client applications. For web applications, a browser provides this capability via hypertext markup language (HTML) and the document object model (DOM). For native applications, APIs such as CoreText® provide similar capabilities. These APIs are usually sufficient for implementing typical applications that require some amount of text to be displayed. However, when an application requires high performance rendering of full screens of text, and that text frequently changes, the standard APIs generally do not provide adequate performance.

One way of improving performance of text rendering is by taking advantage of graphics hardware acceleration provided by most modern graphics processing units (GPUs). Implementing text rendering in an API such as OpenGL® (or WebGL in a browser) allows software to access capabilities of the GPU. Some of the work traditionally done by the central processing unit (CPU) to render text can be transferred to the GPU, which frees the CPU to do other work and delegates the low-level rendering to a processor optimized for that task.

There are many variations of hardware accelerated text rendering algorithms, each with different goals in mind. These algorithms fall into two main categories: those that render glyphs from raster images, and those that render glyphs from higher precision mathematical models. For most client applications, the first type of algorithm is desirable due to its simplicity and efficiency. The second category is more useful when rendering text at many different visual scales.

The disclosure that follows is a variation of the first category of algorithms, those based on raster glyph images.

SUMMARY OF THE DISCLOSURE

The present disclosure, through one or more of its various aspects, embodiments, and/or specific features or sub-components, provides various systems, servers, methods, media, and programs for interfacing compiled codes, such as, for example, JavaScript scripts.

A system and method for rendering text data in web applications is disclosed. Redundant processing is eliminated by pre-computing constant resources and offloading work from the central processing unit to the graphics processing unit. This is generally accomplished by pre-computing before any rendering. A generic index vertex buffer object is created, and for each font, a glyph texture object and glyph position texture object are created. A frame including text is then rendered in which a glyph string texture object is created. For each character, a glyph index-to-texture and glyph offset-to-texture is appended. A glyph texture, glyph position texture and glyph string texture are then bound, and the generic index vertex buffer object using a custom vertex shader is rendered.

In one embodiment of the disclosure, there is a method for rendering text in an application executed on a processing device, which includes a central processor and a graphics processor, the method including generating, by the central processor in non-real-time, passive graphics processor text resources prior to real-time text rendering by the graphics processor; storing the generated passive graphics processor text resources in a graphics processor memory, prior to the real-time text rendering by the graphics processor; generating, by the central processor in real-time, active graphics processor text resources for use by the graphics processor, which are different from the generated passive graphics processor text resources stored in the graphics processor memory; transmitting the generated active graphics processor text resources to the graphics processor; and rendering text, by the graphics processor, during execution of the application by using the generated active graphics processor text resources and generated passive graphics processor text resources designated by the generated active graphics processor text resources.

In another embodiment of the disclosure, there is an apparatus for rendering text in an application, including a central processor performing: generating in non-real-time passive graphics processor text resources prior to real-time text rendering by a graphics processor; storing the generated passive graphics processor text resources in a graphics processor memory, prior to the real-time text rendering by the graphics processor; generating in real-time active graphics processor text resources for use by the graphics processor, which are different from the generated passive graphics processor text resources stored in the graphics processor memory; transmitting the generated active graphics processor text resources to the graphics processor; and the graphics processor performing: rendering text during execution of the application by using the generated active graphics processor text resources and generated passive graphics processor text resources designated by the generated active graphics processor text resources.

In still another embodiment of the disclosure, there is a non-transitory computer-readable medium which stores instructions for rendering text in an application, when executed on a processing device, including generating, by the central processor in non-real-time, passive graphics processor text resources prior to real-time text rendering by the graphics processor; storing the generated passive graphics processor text resources in a graphics processor memory, prior to the real-time text rendering by the graphics processor; generating, by the central processor in real-time, active graphics processor text resources for use by the graphics processor, which are different from the generated passive graphics processor text resources stored in the graphics processor memory; transmitting the generated active graphics processor text resources to the graphics processor; and rendering text, by the graphics processor, during execution of the application by using the generated active graphics processor text resources and generated passive graphics processor text resources designated by the generated active graphics processor text resources.

In one aspect, the generated passive graphics processor text resources are stored in the graphics processor memory as texture objects and vertex buffer objects.

In another aspect, the passive graphics processor text resources include: glyph texture object, which includes pixel data for each glyph; glyph position texture object, which include positions of each glyph in the glyph texture objects; and a generic index vertex buffer object, which includes a sequence of indices where each index represents a single vertex.

In still another aspect, the active graphics processor text resources include: glyph sequence texture object, which includes an index of each glyph in the input glyph sequence and a screen location of each glyph.

In yet another aspect, the generic index vertex buffer object, the glyph position texture object, and the glyph sequence texture object are converted into vertices and texture coordinates that will be used to render glyphs from the glyph texture object using standard texture rendering methods.

In another aspect, the disclosure further includes converting the input index into an index into the glyph sequence texture object; retrieving the glyph index and position from the glyph sequence texture object; converting the glyph index into an index into the glyph position texture; retrieving the glyph texture coordinate and size from the glyph position texture object; converting the input index into the current vertex index; computing an offset of the current vertex from the upper left vertex based on the vertex index; and computing the output vertex and texture coordinate.

In yet one more aspect, the disclosure further includes identifying a glyph texel; and computing an output pixel color by blending text and background colors with a luminance value from the glyph texture as a blending factor.

In still one more aspect, the processing device is a handheld mobile processing device.

In another aspect, font resources are stored in the central processor, the font resources including at least one of a glyph image file including non-overlapping sub-images for each glyph, and a data file including bounding boxes for each glyph sub-image, cursor advance values for each glyph, optional kerning values for each glyph pair and line height and baseline values.

BRIEF DESCRIPTION OF THE DRAWINGS

The present disclosure is further described in the detailed description which follows, in reference to the noted plurality of drawings, by way of non-limiting examples of preferred embodiments of the present invention, in which like characters represent like elements throughout the several views of the drawings.

FIG. 7 illustrates such an exemplary generic index vertex buffer object in accordance with an embodiment of the instant disclosure.

FIG. 8 illustrates an exemplary input string and glyph sequence in accordance with an exemplary embodiment of the instant disclosure.

FIG. 9 illustrates an exemplary glyph sequence texture object in accordance with an exemplary embodiment of the instant disclosure.

DETAILED DESCRIPTION

The present disclosure, through one or more of its various aspects, embodiments and/or specific features or sub-components, is thus intended to bring out one or more of the advantages as specifically noted below.

Figure 1:
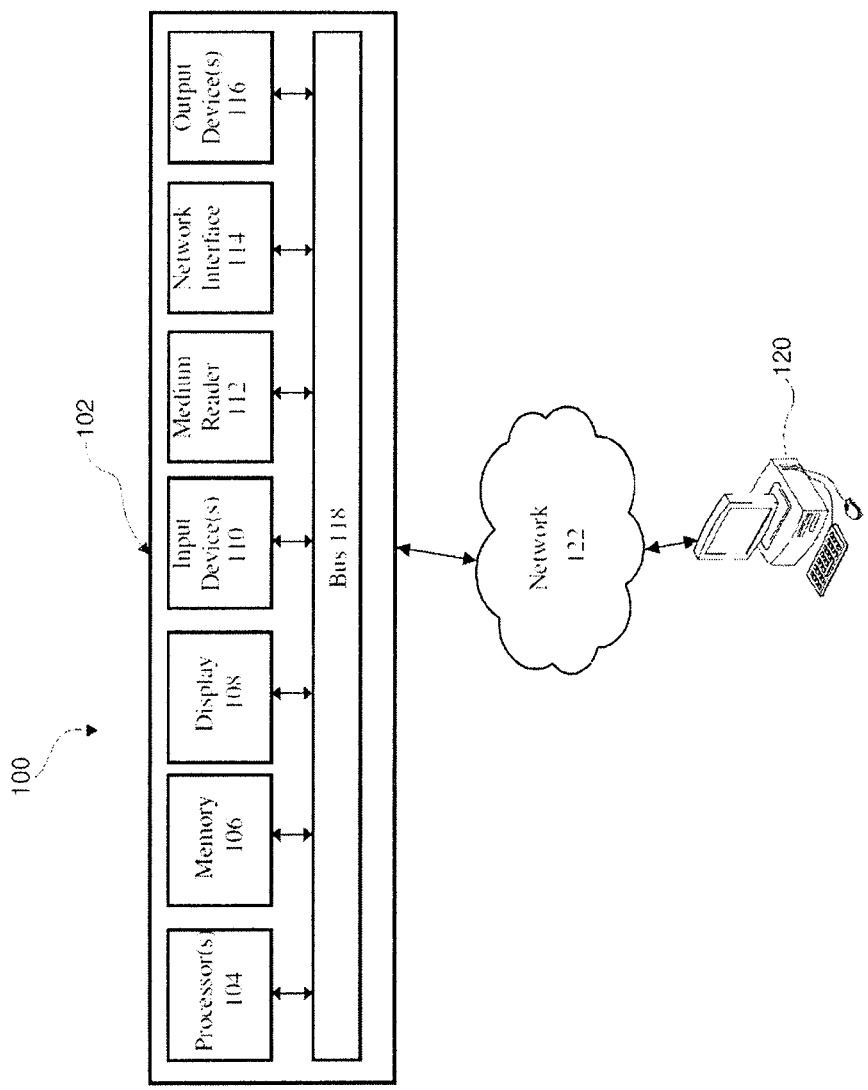
FIG. 1 illustrates an exemplary system for use in accordance with the instant disclosure.

FIG. 1 is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 102 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 2:
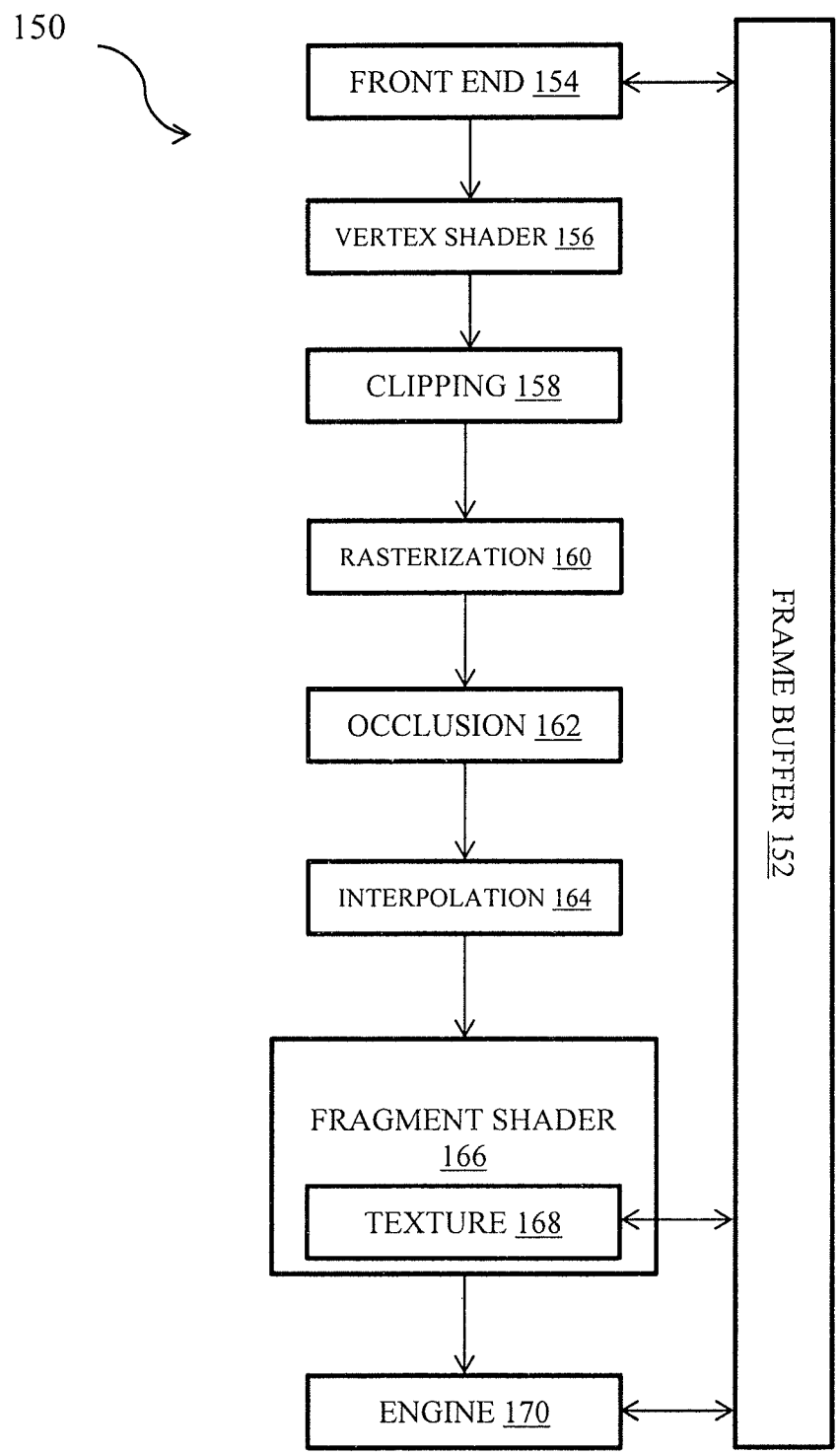
FIG. 2 is an exemplary architecture of a graphics pipeline in accordance with the instant disclosure.

FIG. 2 is an exemplary architecture of a graphics pipeline. Each stage is responsible for processing information initially provided as properties at the end points (vertices) or control points of the geometric primitives used to describe what is to be rendered. Typical primitives in 3D graphics are lines and triangles. The type of properties provided per vertex include x-y-z coordinates, RGB values, translucency, texture, reflectivity and other characteristics. The graphical architecture 150 illustrated in the exemplary embodiment includes, for example, a bus interface/front end 154 that interfaces to the system to send and receive data and commands, a vertex shader 156 that converts each vertex into a 2D screen position, clipping 158 that removes the parts of the image that are not visible in the 2D screen view such as the backsides of objects or areas that the application or window system covers, a primitive assembly/triangle setup in which vertices are collected and converted into triangles and rasterization 160 in which the triangles are filled with pixels known as "fragments," occlusion culling 162 which removes pixels that are hidden (occluded) by other objects in the scene, parameter interpolation 164 in which the values for each pixel that were rasterized are computed, based on color, fog, texture, etc., a fragment shader 166 that adds textures 168 and final colors to the fragments, pixel engines 170 that combine the final fragment color, its coverage and degree of transparency with the existing data stored at the associated 2D location in a frame buffer 152 to produce the final color for the pixel to be stored at that location and the frame buffer 152 which interfaces to the physical memory used to hold the actual pixel values displayed on screen. The frame buffer 152 is also often used to store graphics commands, textures as well as other attributes associated with each pixel.

Figure 3:
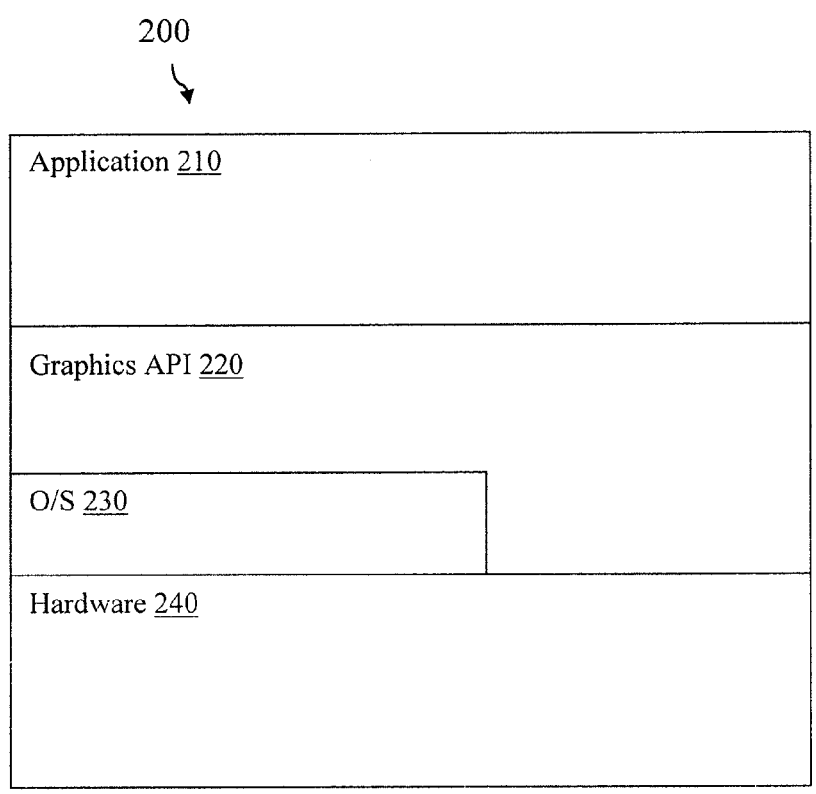
FIG. 3 is an exemplary architecture for a device that is rendering graphics on a display.

FIG. 3 is an exemplary architecture for a device that is rendering graphics on a display. In the disclosed embodiment, the device is any device, such as a smartphone, tablet, desktop, laptop or other computing device (mobile or otherwise). It is appreciated, however, that the embodiment is not limited to the described embodiments, and may include any device capable of displaying or rendering text or graphics. The architecture 200 illustrated in FIG. 3 includes, for example, an application layer 210, graphics API 220, operating system 230 and hardware 240. The application layer 210 may be any client application, such as an application for rendering text. Graphics API 220 may be any type of graphics API including, but not limited to, OpenGL or WebGL, or any other type of graphics API currently on the market or that become available on the market and would be readily incorporated into such graphics API as understood by the skilled artisan. Operating system (O/S) 230 may be any operating system for a mobile device such as Android®, Palm OS®, iOS®, Microsoft Windows®, etc. Hardware 240 may include, for example, a processor, memory, graphics system and communication interface, among other components.

Figure 4:
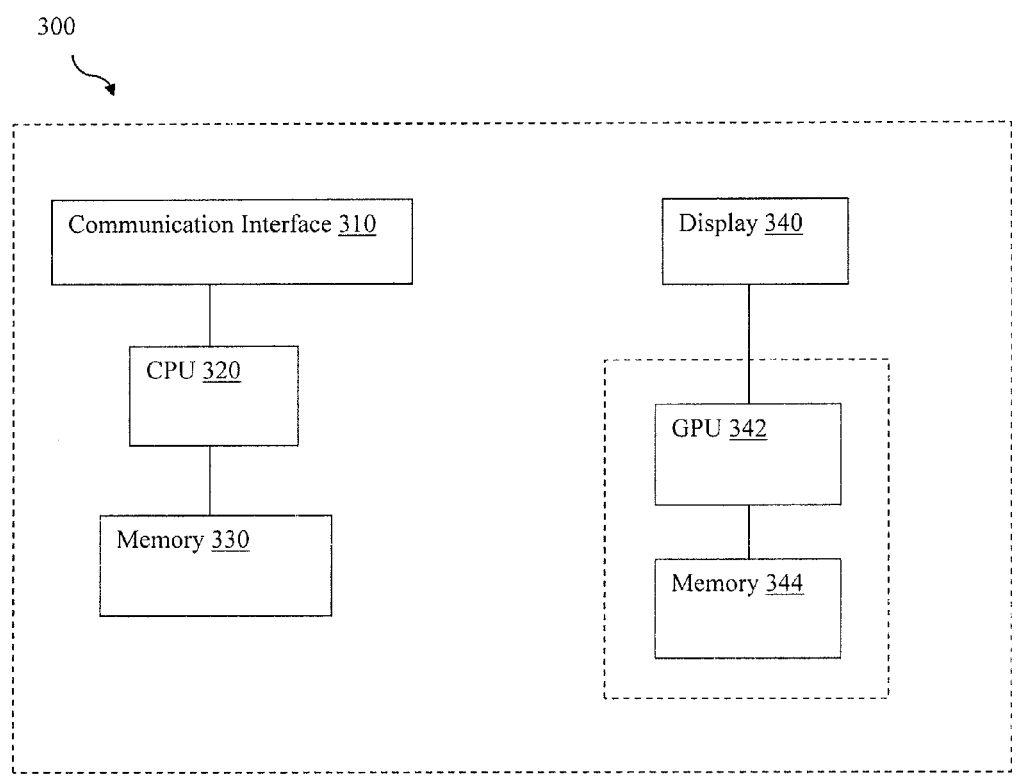
FIG. 4 illustrates an exemplary hardware component in accordance with FIG. 3.

FIG. 4 illustrates an exemplary hardware component in accordance with FIG. 3. Hardware 300 includes, for example, a communications interface 310, central processing unit 320, memory 330, display 340, graphics processing unit (GPU) 342 and memory 344. The communications interface 310 is any communications interface that allows data to be communicated to and from the device rendering the graphics and may be a wired or wireless connection. The memory 344 can include texture memory for storing texture data and a frame buffer for storing pixel data output from graphics processing unit 342. Display 340 is connected to GPU 342 and memory 344 and allows display of output pixel data. It is appreciated that the exemplary hardware component is not intended to limit the scope of the disclosure, but is merely exemplary in nature. As such more or less hardware and/or software may be used as part of the exemplary hardware component.

With the system, apparatus and method described herein, efficiency of text rendering on hardware platforms with GPUs is greatly improved. This is accomplished by reducing the CPU-to-GPU memory bandwidth on the hardware with separate physical CPU and GPU memory, and reducing the number of CPU computations per rendered glyph. These computations are instead performed by the GPU, which is often much more specialized and parallelized than the CPU. Accordingly, the standard vertex buffer object (VBO), which would typically include information about vertices and texture coordinates, is replaced by a generic index VBO (described in more detail below). The indices in the new VBO are used as indices into texture objects, and the texture objects include information about vertices and texture coordinates. This VBO is static, and can be reused without modification for any font and any sequence of glyphs.

Additionally, a glyph position texture object (described below in more detail) is utilized, which supplements the glyph texture by storing the positions of individual glyphs in the glyph texture. In the majority of standard text rendering techniques, on the other hand, require a glyph texture object, which contains a large number of glyphs at arbitrary locations. For each glyph position texture object, this texture encodes a 2D texture coordinate describing the glyph offset, and a 2D size of the glyph in texels. This information is used by a vertex shader to compute texture coordinates within the glyph texture based on input VBO indices, and to compute screen pixel offsets for each of a glyph's six (6) rendered vertices. This texture object is static for each font, and can be reused without modification for any sequence of glyphs. The skilled artisan appreciates that a vertex shader may be, for example, a program executable on the GPU and processes all vertices of a VBO.

In most standard text rendering techniques, a VBO is constructed for each sequence of glyphs containing vertices and texture coordinates for each glyph. In the disclosed embodiments, on the other hand, a glyph sequence texture object encodes a glyph index and screen location for each glyph. This GPU resource is computed dynamically and will be different for each sequence of glyphs, unlike the other GPU resources which remain static. Significantly, as a result of the glyph sequence texture object requiring six (6) bytes per glyph (glyph index: 2 bytes, screen position: 4 bytes), whereas a standard VBO requires 96 bytes per glyph (8 bytes for each of 6 vertices and 6 texture coordinates), there are added efficiencies. That is, approximately $1/16^{th}$ the amount of standard data is generated by the CPU and passed to GPU memory per frame. It is appreciated that the disclosed embodiments are not intended to limit the scope of the disclosure, but are merely exemplary in nature. Resources may be made static or dynamic and resources are not limited to use on the CPU or GPU as described in the exemplary embodiments.

The majority of standard text rendering techniques do not require significant or unusual logic in a vertex shader. In the disclosed embodiment that follows, on the other hand, a custom vertex shader is used with logic to convert the input generic index VBO into the same vertices and texture coordinates that would be used in standard techniques. The input VBO is used as indices into the glyph sequence texture object to determine the current glyph index, the glyph screen location, and the current vertex index (which of its 6 vertices is currently being processed). The glyph index and vertex index are used as an indices into the glyph position texture object to determine the location of the current vertex (as an offset from the glyph screen location) and its corresponding texture coordinate.

Text rendering is generally accomplished by storing glyphs in a texture object (TxO), adding individual glyph vertices and texture coordinates to a VBO. The combination of these two GPU resources are sufficient for basic text rendering. The main downside of this approach is that redundant data is computed by the CPU and sent to the GPU for each string, thereby tying up valuable resources and bandwidth. Traditionally, a standard algorithm is used for text rendering. For example, a pre-computation is performed prior to rendering. For each font, a glyph texture object is created. Then, the frame containing the text is rendered, and a character VBO is created. For each character, a 6 glyph vertices is appended to the VBO and a 6 glyph texture coordinate to the VBO is appended. The glyph texture is then bound, and the character VBO rendered.

In the embodiments of this disclosure, redundant processing is eliminated by pre-computing constant resources and offloading work from the CPU to the GPU. This is accomplished, in general, according to the following method. Pre-computation may be done before any rendering. A generic index VBO is created, and for each font, a glyph texture object and glyph position texture object are created. A frame including text is then rendered in which a glyph string texture object is created. For each character, a glyph index-to-texture and glyph offset-to-texture is appended. A glyph texture, glyph position texture and glyph string texture are then bound, and the generic index VBO using a custom vertex shader is rendered. It is appreciated that the disclosure is not intended to be limited to the described embodiment, but rather is only exemplary in nature. As readily understood by the skilled artisan, the method may include various configurations and be accomplished using any type of software, hardware and/or firmware configuration. The disclosure is now discussed below in more detail with reference to the various embodiments and figures that follow.

Rendering Text

The vertex shader, for example, executes once for each element in a VBO. Usually the VBO includes vertices, texture coordinates, or colors as input value. In the exemplary embodiment of the disclosure, the VBO includes generic indices. This allows the vertex shader to perform like a loop in a standard CPU based program, such as: for (int i=0; i<N; i++) { ... }. Each index represents a single vertex, where six vertices are used to render a single glyph. Hence, for M glyphs, N=6M vertices. In this case, data that would normally be provided via a VBO (vertex, texture coordinate, color, etc.) is instead provided in texture objects, and the input VBO indices are used as an indices into these texture objects.

Pre-Computation of Constant Resources

Figures 5, 6:
FIG. 5 illustrates an exemplary glyph texture object in accordance with an embodiment of the instant disclosure.
FIG. 6 illustrates an exemplary glyph position texture object in accordance with an embodiment of the instant disclosure.

The following GPU resources are created as a non-real-time process (i.e. before render time or "passive") for each font/typeface to be rendered: glyph texture object, glyph position texture object and the generic index VBO. Glyph Texture Object: This texture includes pixel data for the font's glyphs. FIG. 5 illustrates an exemplary glyph texture object in accordance with an embodiment of the instant disclosure. In the exemplary figure, only the lowercase latin characters a through z are represented. Glyph Position Texture Object: This texture includes coordinates of sub-rectangles within the glyph texture object. Each sub-rectangle defines the bounding box of a single glyph, and is represented by position and size. FIG. 6 illustrates an exemplary glyph position texture object in accordance with an embodiment of the instant disclosure. In the exemplary figure, an 8×8 texel RGBA texture object is illustrated. Here, each 2D coordinate is packed into a 4-byte texel and a pair of 16-bit integers. Generic Index VBO: The VBO includes a sequence of integer indices from zero to 6n, where n is the maximum number of characters that can be rendered per each call. FIG. 7 illustrates such an exemplary generic index VBO in accordance with an embodiment of the instant disclosure.

Computation of Dynamic Resources

The following GPU resources are created as a real-time process (i.e at or during render time or "active") for each glyph sequence to be rendered. Font management, text wrapping, kerning, layout, etc. is computed on the CPU, and the results are encoded in the following GPU resources, as follows.

Input Glyph Sequence

Given an input string composed of characters in an encoded format (for example, UTF8), a mechanism is necessary to convert the string to a sequence of glyphs indices of a given font, and to determine screen locations for each glyph. Most operating systems provide this (for example, the Core-Text framework). In the following example, an input string and a corresponding glyph sequence is illustrated in which: the input string is: "text" (line 1) and "to draw" (line 2). FIG. 8 illustrates an exemplary input string and glyph sequence in accordance with an exemplary embodiment of the instant disclosure.

Glyph Sequence Texture Object

FIG. 9 illustrates an exemplary glyph sequence texture object in accordance with an exemplary embodiment of the instant disclosure. The glyph sequence texture object includes the index of each glyph in the input glyph sequence (Char), and the screen location of each glyph (Loc). In the illustrated example of FIG. 9, an 8×8 texel RGBA texture object is shown, where each 2D coordinate is packed into a 4-byte texel and a pair of 16-bit integers. In the illustrated embodiment, each glyph index in the is shown as a 32-bit integer. Since the glyph index is relative to a single font, and no font should include more than $2^{16}$ glyphs, a 16-bit integer is sufficient. This yields the 6 byte per glyph explained above. Although the diagram shows two texels per glyph, each glyph could be packed into one and a half texels. It is appreciated that the disclosure is not intended to be limited to the described embodiments. For example, fonts may include more or less than $2^{16}$ glyphs, more or less that 16-bit integers and yield more of less than 6 bytes per glyph. Moreover, texels per glyph need not be limited to the numbers described.

Rendering the Resources with the GPU

Rendering Individual Glyphs

Figure 10:
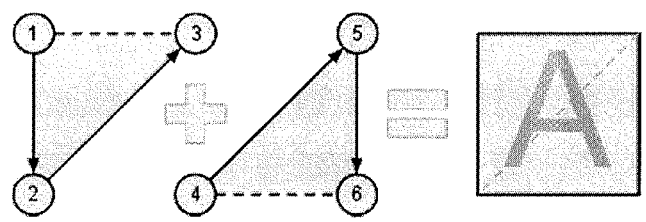
FIG. 10 illustrates an exemplary embodiment of a rendered glyph.
Figure 11:
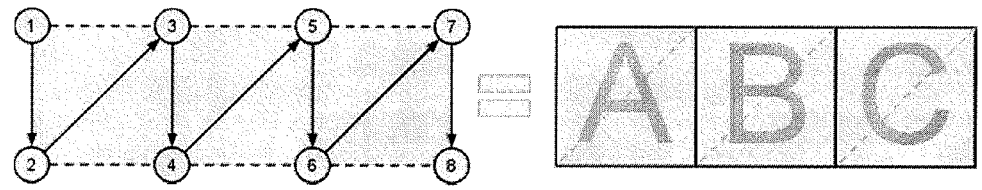
FIG. 11 illustrates another exemplary embodiment of a rendered glyph.

FIG. 10 illustrates an example of a rendered glyph. Each glyph is rendered as a quad composed of two triangles, as illustrated. Three vertices are required for each triangle, and six for each quad. The number of vertices per glyph could be reduced from six to four by use of triangle strips. For example, vertices 2 and 4 could be combined, and vertices 3 and 5 could be combined. However, as illustrated in FIG. 11, vertex 5 and 7, and 6 and 8 are also combined, which implies that each glyph must be rendered exactly adjacent to the previous one. Therefore, in the embodiments of the disclosure, triangle strips are not used since it limits the flexibility of glyph layout methods and requires additional CPU processing to compute separate texture coordinates. While this may increase GPU processing workload, GPU processing is generally highly parallelized, whereas CPU processing is serial.

Vertex Shader

Figure 12:
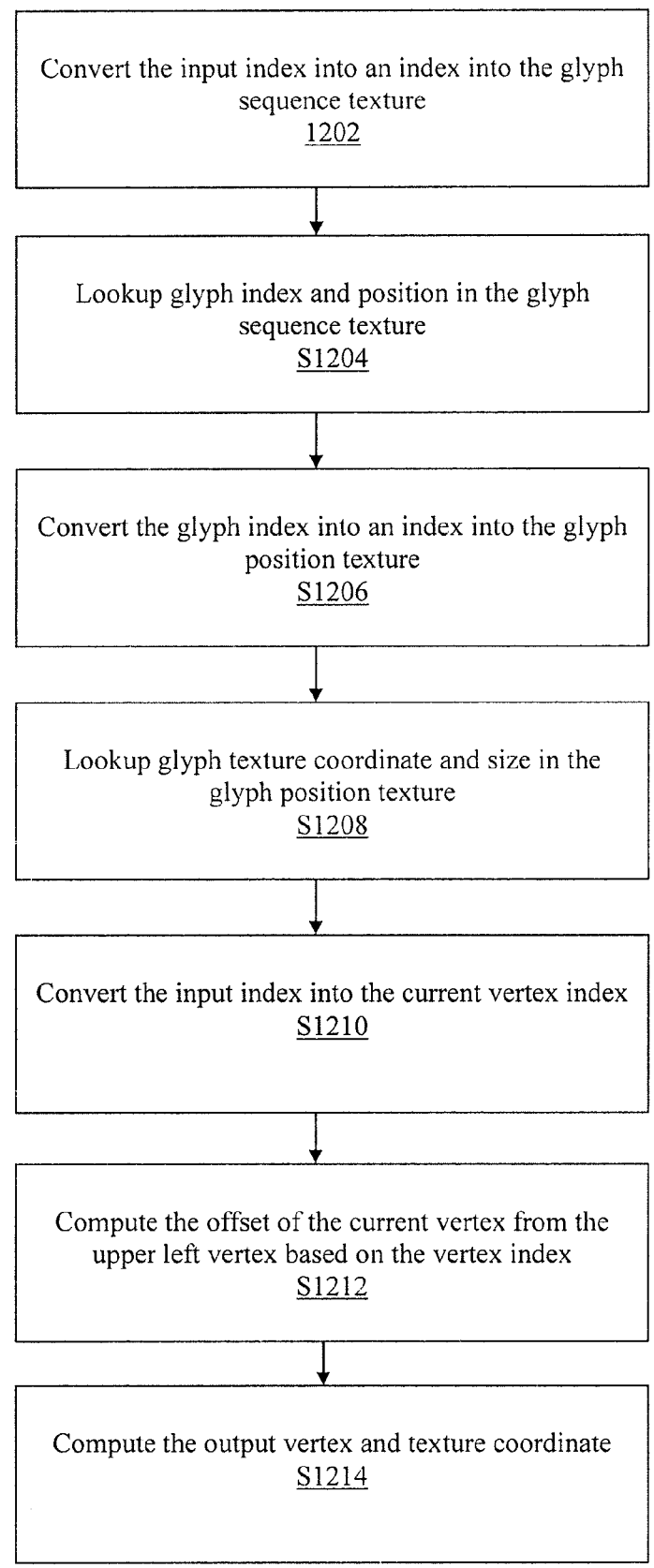
FIG. 12 is an exemplary flow diagram of the vertex shader in accordance with the disclosure.

FIG. 12 is an exemplary flow diagram of the vertex shader in accordance with the disclosure. The vertex shader is implemented for each vertex in the character index VBO. The implementation described below is exemplary and not intended to limit the scope of the instant disclosure.

Operation of the vertex shader begins at S1202, where the vertex shader converts the input index into an index into the glyph sequence texture. The glyph index and position in the glyph sequence texture are then identified at S1204, and the glyph index is converted into an index into the glyph position texture at S1206. The glyph texture coordinate and size in the glyph position texture is identified at S1208, and the input index is converted into the current vertex index at S1210. The vertex shader then computes the offset of the current vertex from the upper left vertex based on the vertex index at S1212, and the output vertex and texture coordinate are computed at S1214.

Fragment Shader

Figure 13:
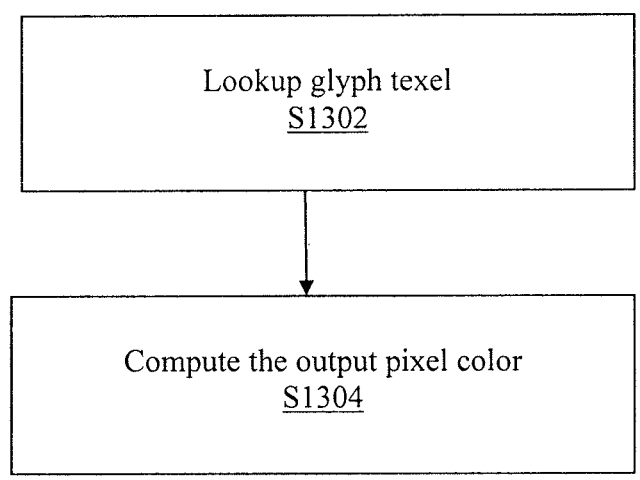
FIG. 13 is an exemplary flow diagram of the fragment shader in accordance with the disclosure.

FIG. 13 is an exemplary flow diagram of the fragment shader in accordance with the disclosure. The fragment shader is implemented for each fragment of the current primitive. The implementation described below is exemplary and not intended to limit the scope of the instant disclosure. Operation of the fragment shader beings at S1302, where a glyph texel is identified. The output pixel color is then computed by blending between text and background colors, with the value from the glyph texture as the blending factor at S1304.

Executing the Text Rendering Pipeline

When executing the text rendering pipeline, the glDrawArrays( ) method should be used with GL_TRIANGLES mode in OpenGL. This produces a single triangle for each set of 6 vertices. Only vertices in the range [0, 6n) should be processed, where n is the number of characters in the character texture object. Vertex and fragment shaders do not define whether input vertices are interpreted as points, lines or triangles, so this data is provided by external code. In this case, the vertices are interpreted as triangles. As an example, in OpenGL this can be done by providing the GL_TRIANGLES argument to glDrawArray( ) Shaders also do not define the number of vertices to process, so this data is also provided by external code. In this case, if an input glyph sequence is composed of N glyphs, at least 6N vertices are provided to the shaders, and indicate that no more than this number of vertices should be processed. As an example, in OpenGL this can be done by passing 6N to glDrawArrays( ), and configuring arrays of at least 6N elements using glVertexAttribPointer( ).

Accordingly, the present invention provides various systems, servers, methods, media, and programs for generating a graphical comparison of data files. Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for rendering text in an application executed on a processing device, which includes a central processor and a graphics processor, the method comprising:
    generating, by the central processor, passive graphics processor text resources prior to real-time text rendering by the graphics processor;
    storing the generated passive graphics processor text resources in a graphics processor memory, prior to the real-time text rendering by the graphics processor;
    generating, by the central processor in real-time, active graphics processor text resources for use by the graphics processor, which are different from the generated passive graphics processor text resources stored in the graphics processor memory;
    transmitting the generated active graphics processor text resources to the graphics processor; and
    rendering text, by the graphics processor, during execution of the application by using the generated active graphics processor text resources and generated passive graphics processor text resources designated by the generated active graphics processor text resources.

2. The method according to claim 1, further comprising the storing of the generated passive graphics processor text resources in the graphics processor memory as texture objects and vertex buffer objects.

3. The method according to claim 1, wherein the passive graphics processor text resources include:
    glyph texture object, which includes pixel data for each glyph;
    glyph position texture object, which include positions of each glyph in the glyph texture objects; and
    a generic index vertex buffer object, which includes a sequence of indices where each index represents a single vertex.

4. The method according to claim 3, wherein the active graphics processor text resources include:
    glyph sequence texture object, which includes an index of each glyph in the input glyph sequence and a screen location of each glyph.

5. The method according to claim 4, further including converting the generic index vertex buffer object, the glyph position texture object, and the glyph sequence texture object into vertices and texture coordinates that will be used to render glyphs from the glyph texture object using standard texture rendering methods.

6. The method according to claim 4, further comprising:
    converting the input index into an index into the glyph sequence texture object;
    retrieving the glyph index and position from the glyph sequence texture object;
    converting the glyph index into an index into the glyph position texture;
    retrieving the glyph texture coordinate and size from the glyph position texture object;
    converting the input index into the current vertex index;
    computing an offset of the current vertex from the upper left vertex based on the vertex index; and
    computing the output vertex and texture coordinate.

7. The method according to 6, further comprising:
    identifying a glyph texel; and
    computing an output pixel color by blending text and background colors with a luminance value from the glyph texture as a blending factor.

8. The method according to claim 1, wherein the processing device is a hand-held mobile processing device.

9. The method according to claim 1, wherein font resources are stored in the central processor, the font resources including at least one of a glyph image file including non-overlapping sub-images for each glyph, and a data file including bounding boxes for each glyph sub-image, cursor advance values for each glyph, optional kerning values for each glyph pair and line height and baseline values.

10. An apparatus for rendering text in an application, comprising:
 a central processor performing:
  generating passive graphics processor text resources prior to real-time text rendering by a graphics processor;
  storing the generated passive graphics processor text resources in a graphics processor memory, prior to the real-time text rendering by the graphics processor;
  generating in real-time active graphics processor text resources for use by the graphics processor, which are different from the generated passive graphics processor text resources stored in the graphics processor memory;
  transmitting the generated active graphics processor text resources to the graphics processor; and
 the graphics processor performing:
  rendering text during execution of the application by using the generated active graphics processor text resources and generated passive graphics processor text resources designated by the generated active graphics processor text resources.

11. The apparatus according to claim 10, further comprising storing of the generated passive graphics processor text resources in the graphics processor memory as texture objects and vertex buffer objects.

12. The apparatus according to claim 10, wherein the passive graphics processor text resources include:
 glyph texture object, which includes pixel data for each glyph; glyph position texture object, which include positions of each glyph in the glyph texture objects; and
 a generic index vertex buffer object, which includes a sequence of indices where each index represents a single vertex.

13. The apparatus according to claim 12, wherein the active graphics processor text resources include:
 glyph sequence texture object, which includes an index of each glyph in the input glyph sequence and a screen location of each glyph.

14. The apparatus according to claim 13, further including the central processor converting the generic index vertex buffer object, the glyph position texture object, and the glyph sequence texture object into vertices and texture coordinates that will be used to render glyphs from the glyph texture object using standard texture rendering methods.

15. The apparatus according to claim 14, further comprising the central processor:
 converting the input index into an index into the glyph sequence texture object;
 retrieving the glyph index and position from the glyph sequence texture object;
 converting the glyph index into an index into the glyph position texture;
 retrieving the glyph texture coordinate and size from the glyph position texture object;
 converting the input index into the current vertex index;
 computing an offset of the current vertex from the upper left vertex based on the vertex index; and
 computing the output vertex and texture coordinate.

16. The apparatus according to 15, further comprising the central processor:
 identifying a glyph texel; and
 computing an output pixel color by blending text and background colors with a luminance value from the glyph texture as a blending factor.

17. The apparatus according to claim 10, wherein the processing device is a hand-held mobile processing device.

18. The apparatus according to claim 10, wherein font resources are stored in the central processor, the font resources including at least one of a glyph image file including non-overlapping sub-images for each glyph, and a data file including bounding boxes for each glyph sub-image, cursor advance values for each glyph, optional kerning values for each glyph pair and line height and baseline values.

19. A non-transitory computer-readable medium which stores instructions for rendering text in an application, when executed on a processing device, comprising:
 generating, by the central processor, passive graphics processor text resources prior to real-time text rendering by the graphics processor;
 storing the generated passive graphics processor text resources in a graphics processor memory, prior to the real-time text rendering by the graphics processor;
 generating, by the central processor in real-time, active graphics processor text resources for use by the graphics processor, which are different from the generated passive graphics processor text resources stored in the graphics processor memory;
 transmitting the generated active graphics processor text resources to the graphics processor; and
 rendering text, by the graphics processor, during execution of the application by using the generated active graphics processor text resources and generated passive graphics processor text resources designated by the generated active graphics processor text resources.

20. The non-transitory computer-readable medium according to claim 19, further comprising the storing of the generated passive graphics processor text resources in the graphics processor memory as texture objects and vertex buffer objects.

21. The non-transitory computer-readable medium according to claim 19, wherein the passive graphics processor text resources include:
 glyph texture object, which includes pixel data for each glyph;
 glyph position texture object, which include positions of each glyph in the glyph texture objects; and
 a generic index vertex buffer object, which includes a sequence of indices where each index represents a single vertex.

22. The non-transitory computer-readable medium according to claim 21, wherein the active graphics processor text resources include:
 glyph sequence texture object, which includes an index of each glyph in the input glyph sequence and a screen location of each glyph.

23. The non-transitory computer-readable medium according to claim 22, further including converting the generic index vertex buffer object, the glyph position texture object, and the glyph sequence texture object into vertices and texture coordinates that will be used to render glyphs from the glyph texture object using standard texture rendering methods.

24. The non-transitory computer-readable medium according to claim 22, further comprising:
 converting the input index into an index into the glyph sequence texture object;

retrieving the glyph index and position from the glyph sequence texture object;

converting the glyph index into an index into the glyph position texture;

retrieving the glyph texture coordinate and size from the glyph position texture object;

converting the input index into the current vertex index;

computing an offset of the current vertex from the upper left vertex based on the vertex index; and computing the output vertex and texture coordinate.

25. The non-transitory computer-readable medium according to 24, further comprising:

identifying a glyph texel; and computing an output pixel color by blending text and background colors with a luminance value from the glyph texture as a blending factor.

26. The non-transitory computer-readable medium according to claim 19, wherein the processing device is a hand-held mobile processing device.

27. The non-transitory computer-readable medium according to claim 19, wherein font resources are stored in the central processor, the font resources including at least one of a glyph image file including non-overlapping sub-images for each glyph, and a data file including bounding boxes for each glyph sub-image, cursor advance values for each glyph, optional kerning values for each glyph pair and line height and baseline values.

* * * * *